US006876949B2

(12) United States Patent
Hilliard et al.

(10) Patent No.: US 6,876,949 B2
(45) Date of Patent: Apr. 5, 2005

(54) NORMALIZATION OF INDUCTIVE VEHICLE DETECTOR OUTPUTS

(75) Inventors: Steven R. Hilliard, Knoxville, TN (US); Geoffrey C. Yerem, Knoxville, TN (US)

(73) Assignee: Inductive Signature Technologies, Inc., Knoxville, TN (US)

(*) Notice: Subject to any disclaimer, the term of this patent is extended or adjusted under 35 U.S.C. 154(b) by 88 days.

(21) Appl. No.: 10/384,164

(22) Filed: Mar. 7, 2003

(65) Prior Publication Data

US 2003/0174071 A1 Sep. 18, 2003

Related U.S. Application Data

(60) Provisional application No. 60/362,692, filed on Mar. 8, 2002, provisional application No. 60/382,415, filed on May 21, 2002, provisional application No. 60/411,320, filed on Sep. 17, 2002, provisional application No. 60/424,916, filed on Nov. 8, 2002, and provisional application No. 60/440,465, filed on Jan. 16, 2003.

(51) Int. Cl.[7] .............................................. G06F 19/00
(52) U.S. Cl. ....................................... 702/182; 340/941
(58) Field of Search ......................... 702/182, 185–188; 340/933, 941

(56) References Cited

U.S. PATENT DOCUMENTS

| | | | | |
|---|---|---|---|---|
| 4,031,510 A | | 6/1977 | King | |
| 4,731,867 A | | 3/1988 | Seabury et al. | |
| 4,996,716 A | | 2/1991 | Potter et al. | |
| 5,057,831 A | | 10/1991 | Strang et al. | |
| 5,089,815 A | | 2/1992 | Potter et al. | |
| 5,164,995 A | * | 11/1992 | Brooks et al. | 382/152 |
| 5,198,811 A | | 3/1993 | Potter et al. | |
| 5,278,555 A | | 1/1994 | Hoekman | |
| 6,339,383 B1 | * | 1/2002 | Kobayashi et al. | 340/907 |
| 6,342,845 B1 | | 1/2002 | Hilliard et al. | |
| 6,345,225 B1 | | 2/2002 | Lees | |
| 6,417,784 B1 | | 7/2002 | Hilliard et al. | |
| 6,535,143 B1 | * | 3/2003 | Miyamoto et al. | 340/933 |

OTHER PUBLICATIONS

US 4,926,494, 5/1990, Potter (withdrawn)

* cited by examiner

*Primary Examiner*—Edward Raymond
(74) *Attorney, Agent, or Firm*—Pitts & Brittian, P.C.

(57) ABSTRACT

Methods and apparatus for such that a measurement made for a given vehicle by a given detector is substantially repeatable using either the same detector from one time to another, or using a different detector. In one embodiment, normalization coefficients are determined by measuring one or more common probe vehicles and standardizing the outputs of the detector(s) to give a consistent output. In another embodiment, normalization coefficients are determined by measuring one or more operating or circuit parameters of the detector circuit(s), and compensating the outputs of the detector(s) for variations in these measured parameters.

25 Claims, 4 Drawing Sheets

NORMALIZATION OF INDUCTIVE VEHICLE DETECTOR OUTPUTS

CROSS-REFERENCE TO RELATED APPLICATIONS

This application is a non-provisional application based on Provisional Application Ser. No. 60/362,692, filed Mar. 8, 2002, Provisional Application Ser. No. 60/382,415, filed on May 21, 2002, Provisional Application Ser. No. 60/411,320, filed on Sep. 17, 2002, Provisional Application Ser. No. 60/424,916, filed on Nov. 8, 2002, and Provisional Application Ser. No. 60/440,465, filed on Jan. 16, 2003.

STATEMENT REGARDING FEDERALLY SPONSORED RESEARCH OR DEVELOPMENT

Not Applicable

COMPUTER PROGRAM LISTING APPENDIX

The computer program listing appendix contained within files "Bivalent.c" and "Bivalent.h" on compact disc "1 of 1", which has been filed with the United States Patent and Trademark Office in duplicate, is incorporated by reference.

BACKGROUND OF THE INVENTION

1. Field of Invention

The present invention relates to the processing of signals produced by inductive vehicle detectors, and more particularly to the normalization of such signals such that the same vehicle is recognized by different detectors or by the same detector at a different times.

2. Description of the Related Art

In inductive vehicle detectors of the prior art it is common practice to use manual switches to select the "frequency" and "sensitivity" of an inductive vehicle detector. Typical sensitivity settings are implemented as a threshold value that is offset from a baseline value by a fixed amount usually expressed in units of percent change in inductance. A vehicle is considered to have been detected when the inductance measurement output of the detector deviates from the baseline value by an amount greater than or equal to the threshold value. Inductive vehicle detectors generally have signature outputs which are typically digitized representations of an analog waveform corresponding to measured inductance versus time, and they generally have bivalent outputs which indicate the instantaneous presence or absence of a vehicle.

Typically, the baseline value is automatically adjusted instantaneously on power-up or reset, and adjusted incrementally in response to environmental drift; while the sensitivity threshold value is only adjusted manually. This leads directly to repeatability errors in presence, speed, length, occupancy and acceleration measurements which are based on the bivalent output of the detector.

It is not known in the prior art to calibrate either the signature output or threshold values of an inductive vehicle detector so that variations in the electrical parameters of the wire-loop and lead-line circuits from one detector to another, or time-varying environmental parameters for any particular loop-lead circuit, will cause a reduced repeatability error, from one detector to another, in the detector output.

BRIEF SUMMARY OF THE INVENTION

It is desirable to normalize the detector outputs of two or more vehicle detectors so that a measurement made for a given vehicle by a given detector is substantially repeatable using either the same detector from one time to another, or using a different detector.

This is accomplished in one embodiment by measuring one or more common probe vehicles and standardizing the outputs of the detector(s) to give a consistent output. In another embodiment, this is accomplished by measuring one or more operating or circuit parameters of the detector circuit(s), and compensating the outputs of the detector(s) for variations in these measured parameters. In one embodiment of the present invention, one or more features of a plurality of vehicles representing the general vehicle population are measured and compared to an expected population distribution of the measured feature(s). An output of the detector is then calibrated based on this comparison.

A probe vehicle is a special vehicle driven over the vehicle detector(s) for the special purpose of calibrating the detector(s). In another embodiment, common vehicular traffic is used as passive probes using vehicle re-identification techniques. For example, two un-calibrated vehicle detectors are positioned some distance apart on a roadway, and a random vehicle happens across the two detectors as it journeys on its way. Because the two detectors are un-calibrated, it is likely that there will be significant differences between the outputs of the two detectors even though they have both detected the same vehicle. If a working assumption is made that the two vehicles were in fact the same vehicle, then the variations in the outputs of the two detectors are normalized to produce more similar outputs the next time this vehicle is detected. A first order calibration of the signature outputs of two inductive vehicle detectors takes the form of a simple scaling coefficient for each detector, and each sample from a detector is multiplied by its associated first order scaling coefficient. In one embodiment of the present invention, a second order scaling coefficient is also used in order to achieve acceptable calibration between inductive vehicle detectors. These n-order calibration coefficients for any x-detectors and any y-probe vehicles are derived by using linear algebra to solve multiple simultaneous equations.

Another embodiment calibrates x-detectors without the use of probe vehicles (y=0) by measuring a plurality of electrical circuit parameters and operating parameters for the x-detectors, and calibrating the outputs of the detectors based on the values of these measured parameters.

These calibration coefficients may be used to adjust a characteristic threshold magnitude of an inductive vehicle detector signature output prior to comparing the output to a target threshold value (bivalent detector). In another embodiment, the threshold value itself is adjusted; typically using only the first-order calibration coefficient. The threshold may also be adjusted as a function of a baseline noise level.

In the present invention, threshold calibration is typically associated with improving the repeatability of inductive length measurements. According to the present invention, inductive length is calibrated using a first-order coefficient, and a second order calibration coefficient is used to simultaneously calibrate the maximum magnitude of a signature.

It is a first object of the present invention to use one or more vehicles as passive probes to normalize an amplitude of a signature output of an inductive vehicle detector to compensate for variations in wire-loop, lead-line, driving frequency, and any other significant circuit parameter or operating parameter from one detector to another.

It is a second object of the present invention to use one or more vehicles as passive probes to normalize an amplitude of a signature output of an inductive vehicle detector to compensate for the effects of environmental drift for a particular detector from one time to another.

It is a third object of the present invention to use one or more vehicles as passive probes to normalize a sensitivity threshold of an inductive vehicle detector to compensate for variations in wire-loop, lead-line, driving frequency, and any other significant circuit parameter or operating parameter from one detector to another.

It is a fourth object of the present invention to use one or more vehicles as passive probes to normalize a sensitivity threshold of an inductive vehicle detector to compensate for the effects of environmental drift for a particular detector from one time to another.

It is a fifth object of the present invention to use one or more measured detector circuit parameters, or operating parameters, to normalize an amplitude of a signature output of and inductive vehicle detector to compensate for variations in wire-loop, lead-line, driving frequency, and any other significant circuit parameter or operating parameter from one detector to another.

It is a sixth object of the present invention to use one or more measured detector circuit parameters, or operating parameters, to normalize an amplitude of a signature output of an inductive vehicle detector to compensate for the effects of environmental drift for a particular detector from one time to another.

It is a seventh object of the present invention to use one or more measured detector circuit parameters, or operating parameters, to normalize a sensitivity threshold of an inductive vehicle detector to compensate for variations in wire-loop, lead-line, driving frequency, and any other significant circuit parameter or operating parameter from one detector to another.

It is a eighth object of the present invention to use one or more measured detector circuit parameters, or operating parameters, to normalize a sensitivity threshold of an inductive vehicle detector to compensate for the effects of environmental drift for a particular detector from one time to another.

It is a ninth object of the present invention to measure one or more features of a plurality of vehicles to produce a local population distribution table.

It is a tenth object of the present invention to measure one or more features of a plurality of vehicles to produce a standard population distribution table.

It is an eleventh object of the present invention to calibrate an output of a vehicle detector based on a characteristic of the local vehicle population.

It is a twelfth object of the present invention to measure one of more features of a plurality of vehicles to produce a local population distribution table suitable for comparison with a standard population distribution table.

It is a thirteenth object of the present invention to compare a local population distribution table with a standard population distribution table, and to calibrate an output of a vehicle detector based on the result of the comparison.

It is a fourteenth object of the present invention to calibrate the output of an inductive vehicle detector to substantially reduce or eliminate the effects of inconsistent loop geometry on detector accuracy.

It is a fifteenth object of the present invention to scale an inductive signature using an n-th order equation having a set of coefficients that are substantially similar to a set of coefficients previously used to calibrate the signature.

It is a sixteenth object of the present invention to characterize a feature of a local economy based on a measured vehicle population distribution.

It is a seventeenth object of the present invention to characterize a feature of a trend of a local economy based on a measured vehicle population distribution.

It is an object of the present invention to set a maximum limit for a sensitivity threshold based on a measured baseline noise.

It is an object of the present invention to calibrate an out-of-pavement vehicle detector using feedback from a second vehicle detector. It is another object of the present invention to calibrate an out-of-pavement vehicle detector using real-time feedback from a second vehicle detector in-situ where the out-of-pavement detector is to be deployed in the field. It is still another object of the present invention to optimize one or more variable parameters of an out-of-pavement detector system using feedback from a reference detector system.

It is an object of the present invention to enable a mobile service vehicle to transmit normalization coefficients to a detector, based on the inductive signature of the mobile service vehicle. It is another object to identify a mobile service vehicle to a detector so that the detector can measure the signature of the service vehicle and compare its known reference signature to then determine normalization coefficients.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

It is desirable to normalize the detector outputs of two or more vehicle detectors so that a measurement made for a given vehicle by a given detector is substantially repeatable using either the same detector from one time to another, or using a different detector.

Figure 1:
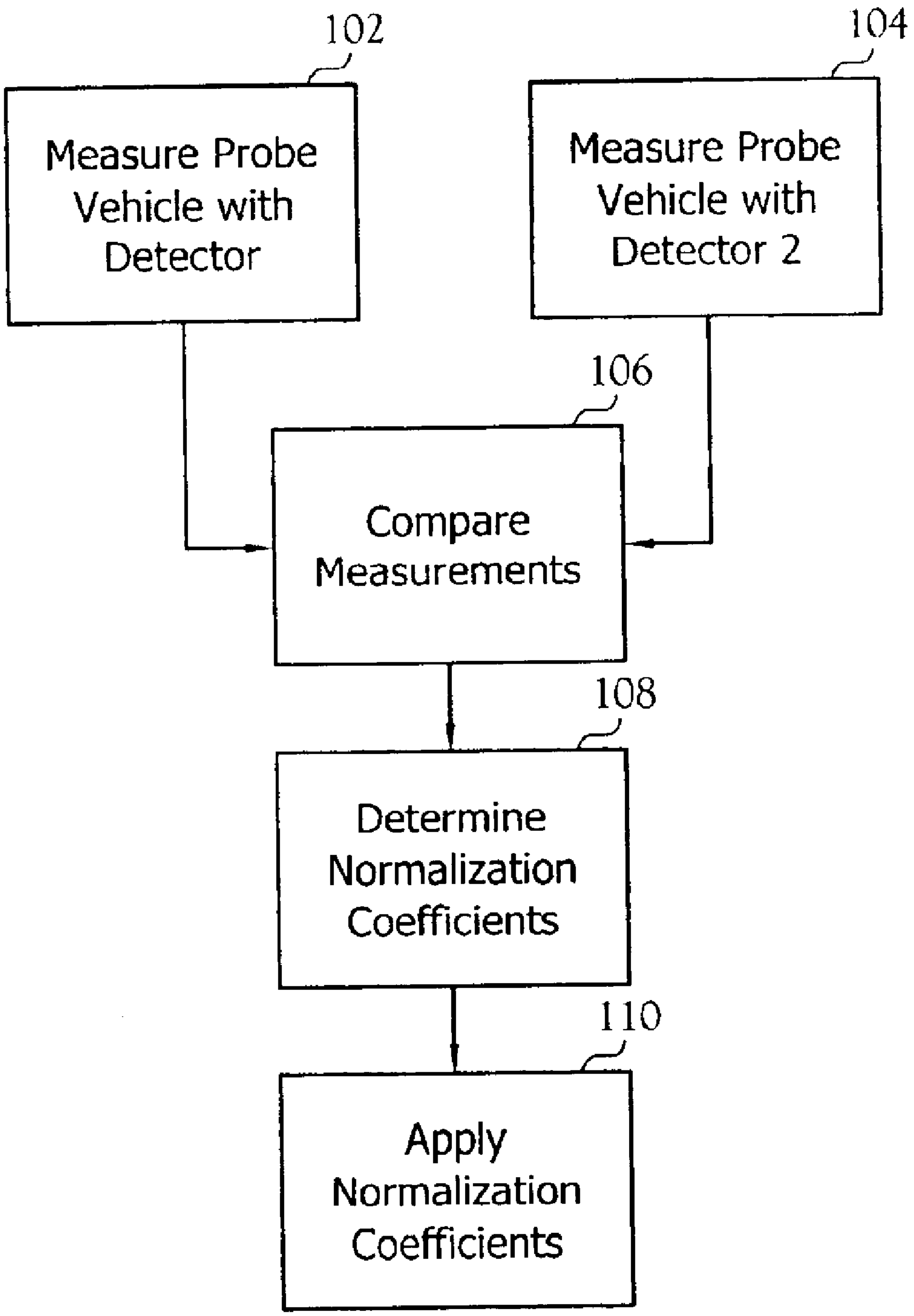
FIG. 1 is a block diagram showing the steps of using a probe vehicle.

FIG. 1 illustrates an embodiment in which a probe vehicle is used to determine the normalization coefficients between detectors. A probe vehicle is driven by a first detector and its inductive signature is measured 102. The same probe vehicle is driven by a second detector and its inductive signature is measured 104. The two inductive signatures are compared 106 and the normalization coefficients are determined 108. Finally, the normalization coefficients are applied to one or both detectors 110.

A probe vehicle is a special vehicle driven by the vehicle detector(s) for the special purpose of calibrating the detector (s), or any common vehicular traffic is used as passive probes using vehicle re-identification or population distribution normalization techniques. For example, two un-calibrated vehicle detectors are positioned some distance apart on a roadway, and a random vehicle happens across the two detectors as it journeys on its way. Because the two detectors are un-calibrated, it is likely that there will be significant differences between the outputs of the two detectors even though they have both detected the same vehicle. If a working assumption is made that the two vehicles were in fact the same vehicle, then the variations in the outputs of the two detectors can be normalized to produce more similar outputs the next time this vehicle is detected. A first order calibration of the signature outputs of two inductive vehicle detectors would take the form of a simple scaling coefficient for each detector, and each sample of a detector would be multiplied by its associated first order scaling coefficient. In the preferred embodiment of the present invention, a second order scaling coefficient is also used in order to achieve acceptable calibration between inductive vehicle detectors.

In one embodiment these n-order calibration coefficients for any x-detectors and any y-probe vehicles are determined by solving multiple simultaneous equations of the form: For i=0 to y−1:

$$Y_{i0}=C1_0*Y0_{i0}+(C2_0*Y0_{i0})^2+\dots+(Cn_0*Y0_{i0})^n$$

$$Y_{i1}=C1_1*Y0_{i1}+(C2_1*Y0_{i1})^2+\dots+(Cn_1*Y0_{i1})^n$$

$$Y_{i(x-1)}=C1_{(x-1)}*Y0_{i(x-1)}+(C2_{(x-1)}*Y0_{i(x-1)})^2+\dots+(Cn_{(x-1)}*Y0i_{(x-1)})^n$$

where $Y_{i0}=Y_{i1}=\dots=Y_{i(x-1)}$ is any calibrated characteristic magnitude of x vehicle detector output(s) associated with a given probe vehicle, i, (when i=0, this calibrated characteristic magnitude is arbitrarily chosen to be any practical value which is convenient);

$Y_{i(x-1)}$=an un-calibrated characteristic magnitude, measured by an x'th vehicle detector-x, of a given probe vehicle, i; and $Cn_{(x-1)}$=nth order calibration coefficient for detector-x.

The following series identifies the normalized results with the coefficients to be applied to specific signature features.

$$Y=C_0+C_1*X+C_2*X^2+\dots+C_N*X^N$$

$$Y_1=C_0+C_1*X_1+C_2*X_1^2+\dots+C_N*X_1^N$$

$$Y_2=C_0+C_1*X_2+C_2*X_2^2+\dots+C_N*X_2^N$$

$$\dots$$

$$Y_M=C_0+C_1*X_M+C_2*X_M^2+\dots+C_N*X_M^N$$

where X is the measured vehicle signature feature,

Y is the corresponding desired normalized result for a given single detector,

C is the coefficient vector to be found for the given detector,

N is the order of the correction, and

M is the number of feature measurements. The feature measurements can be from the same vehicle or from different vehicles. An example feature would be distinguishable local and global maxima and minima as well as inflection points in the signature. While M should be greater than or equal to N, it is advantageous to measure a plurality of vehicles with signature features that vary over a wide range of amplitudes. This provides an over determined system which can be solved in a least-square-error sense to give a best-fit correction curve.

A coefficient vector C can be found for each detector. If the baselines resulting from both detectors are at zero, the coefficient C0 will equal zero.

$$0=C_n*X_{kn}+C_m*X_{km}$$

$$1\leq k\leq M$$

$$1\leq n\leq N$$

where C is the coefficient vector of a specific wire loop to be found,

M is the number of feature measurements, and

N is the number of (wire) loops to be normalized. In one embodiment, this equation is used to find the a first order scaling factor for a plurality of loops referenced to one loop. For a given signature created by a single loop, an equation of the form shown is made for each corresponding signature produced by a peer loop. With a number of signature pairs, a homogeneous system results. It is important to have all of the loops represented with enough pairs to connect every loop to each other. The system can be then solved for C with respect to any loop i by setting coefficient $C_i$ equal to 1. This equation is generalized for higher order corrections.

To calibrate x vehicle detectors to the nth-order using y probe vehicles (a minimum of nx probe vehicle passes would typically be desirable, with each of n probe vehicles being measured by each of x detectors being optimal, though many more probe vehicle passes could be used to help average away measurement errors), x*y simultaneous equations of the form shown are solved, using linear algebra, or, in another embodiment, they are solved using iterative non-linear techniques. It is advantageous to use a plurality of vehicles as passive probes to calibrate multiple detectors.

Another embodiment for calibrating a single detector using one or more probe vehicles is to classify the vehicle(s) using the detector, and then use a standardized characteristic magnitude for vehicles of the same, or similar classification, to proceed with the calibration process.

In one embodiment, the normalization coefficients are determined without resort to probe vehicles (y=0) by measuring a plurality of electrical circuit parameters and operating parameters for the x-detectors, and calibrating the outputs of the detectors based on the values of these measured parameters.

For example, the Q-factor of an inductive vehicle detector circuit is partially a function of the series resistance of the associated oscillator circuit, including the wire-loop, lead-lines, capacitors, and eddy-current losses to ground. As lead-line length increases (or conductor diameter decreases), the resistance of the circuit increases and the Q-factor goes down. In fixed-frequency type inductive vehicle detectors, where the impedance of the oscillator circuit is being measured at a fixed frequency, this variation in Q-factor with lead-line length effectively scales the output of the detector to be substantially inversely proportional to the series resistance of the circuit. This factor is a first-order effect and can be compensated for, or normalized, by measuring the resistance of the circuit (or Q-factor) and multiplying the output of the detector by a scaling factor. In one embodiment, the detectors directly measure the loop circuit impedance (including both the in-phase and quadrature components) at the sensor unit operating frequency to determine the frequency response, or Q-factor, of the wire loop circuit at that frequency.

Figure 2:
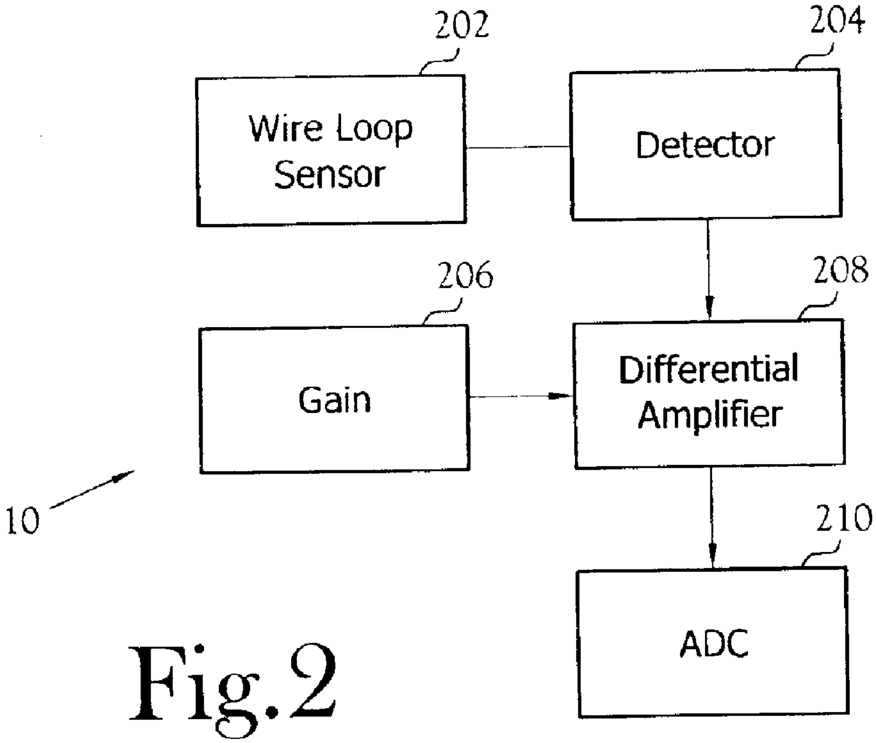
FIG. 2 is a block diagram of a loop detector with a first order correction.

FIG. 2 illustrates a block diagram of a loop detector 10 with a first order correction. A wire loop sensor 202 is connected to an inductive detector 204. The detector 204 feeds a differential amplifier 208 that has a gain adjust 206. The output of the differential amplifier 208 goes to an analog-to-digital converter 210.

The normalization is accomplished, in the illustrated embodiment, with an analog multiplier 208, such as a programmable gain front-end differential (instrumentation) amplifier 208. In one embodiment the gain 206 of the amplifier 208 is chosen as described above for the method of determining the first order coefficient with probe vehicles.

In another embodiment the gain 206 of the amplifier 208 is chosen to yield a substantially consistent amplitude within the oscillator circuit regardless of the Q-factor of the oscillator circuit. An advantage of the differential-type amplifier 208 is that it can be used to boost the differential signal of the oscillator without boosting unwanted common-mode noise at the same time. In addition to being useful for normalizing the output of an inductive vehicle detector, this programmable-gain front-end amplifier 208 also has the advantage of improving the signal-to-noise ratio of wire-loop detectors, and thereby enabling the use of smaller diameter lead wires (which have intrinsically higher resistance per unit length). Large diameter lead wire is more expensive than smaller diameter lead wires, and they consume much more conduit space than smaller lead wires.

In still another embodiment, the loop detector 10 directly measures the loop circuit impedance (including both the in-phase and quadrature components) at the sensor 202 operating frequency to determine the frequency response, or Q-factor, of a wire-loop circuit at that frequency and then the detector circuit normalizes the frequency response of the detector to a standard value; that is, adaptive frequency response control. In this embodiment, the gain adjust 206 is automatically set by the circuit that measure the loop circuit impedance.

Figure 3:
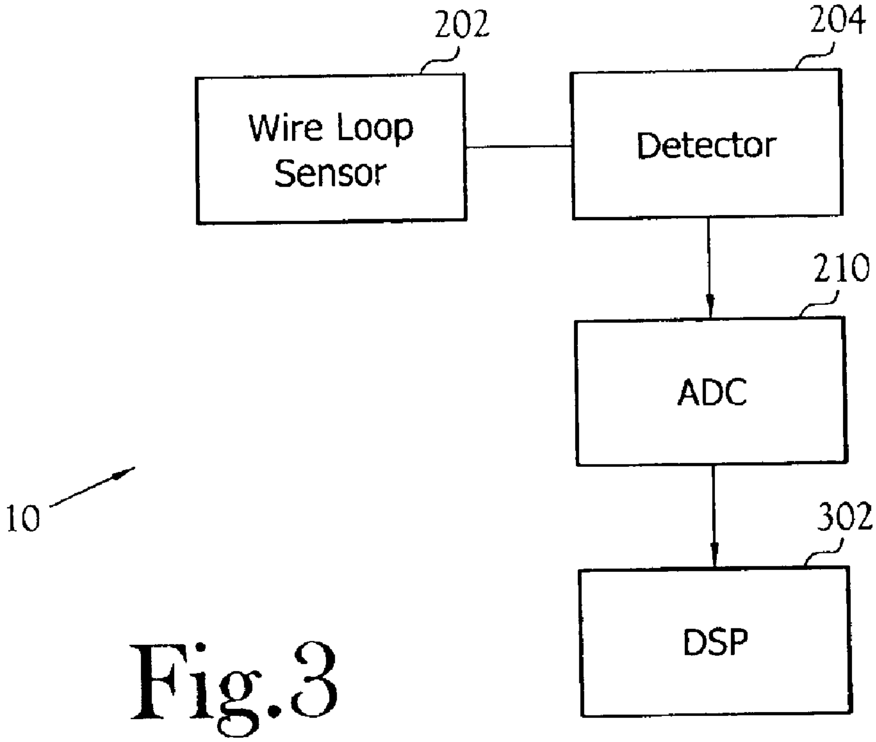
FIG. 3 is an block diagram of a loop detector with a digital normalization.

FIG. 3 illustrates a block diagram of a loop detector 10' with digital normalization. In this embodiment, the loop detector 10' includes a wire loop sensor 202 is connected to an inductive detector 204. The detector 204 goes to an analog-to-digital converter 210, which feeds a digital signal processor (DSP) 302. The DSP 302 compensates for first-order effects by multiplying a digitized pre-cursor of the detector 204 output. In another embodiment, the second order effects and higher can be compensated by numerical computing means within the DSP 302.

One embodiment of determining and applying the normalization coefficients is disclosed in the computer program listing appendix provided to the United States Patent and Trademark Office on a compact disc. The computer software includes a routine for applying a scaling factor for a first order normalization coefficient. In particular, one routine applies a first first-order signature magnitude normalization coefficient component (d→AutoRanger) in a computationally efficient way by right-shifting a raw inductance measurement sample (d→rawsample).

The software also includes a routine for continually measuring the differential energy (d→avgDifferentialEnergy) of a series of raw inductive signature samples. If a vehicle is not presently being detected, a software routine computes a second first-order signature magnitude normalization coefficient component (d→adjust).

The computer software normalizes a sensitivity threshold (d→threshold) of an inductive vehicle detector using both a first (d→AutoRanger) and a second (d→adjust) first-order normalization coefficient component. In this case, the sensitivity threshold is constrained by a maximum bound determined by the value of d→sense, and may be adjusted to a lower sensitivity based on the value of d→avgDifferentialEnergy, which corresponds to a measure of an average noise level on a series of inductance measurement samples. Finally, the software applies the second first-order signature magnitude normalization coefficient component (d→adjust), producing a normalized output signature (d→outSig).

One example of a second order electrical circuit operating parameter that can be normalized according to the present invention, is frequency response. In a fixed-frequency type detector circuit, the frequency response of an inductance-capacitance-resistance oscillator circuit typically has one primary resonance frequency where the response (oscillator amplitude) of the circuit is a maximum, and this response generally declines as the oscillator frequency is moved farther away (increasing or decreasing frequencies). Over a range of frequencies centered at the resonance frequency, this frequency response curve is smooth and non-linear. The output of the detector, at any given operating frequency, depends on the response of the circuit at that frequency. When a vehicle is detected, the frequency response curve shifts, and the magnitude of the response at the detector operating frequency changes; this can be measured by a fixed-frequency detector. Since the frequency response curve is non-linear, normalizing the output of such a fixed-frequency detector according to various operating frequencies requires a higher-order adjustment than a first-order effect such as Q-factor. The inverse of the derivative of the frequency response curve at the chosen operating frequency can give a good first-order approximation to a normalizing coefficient; and a lookup table is a computationally efficient way to compensate for such higher-order effects.

Though the present invention has been exemplified using a fixed-frequency type inductive vehicle detector, those skilled in the art will recognize that other types of vehicle detector outputs, particularly frequency counting type detector outputs, are normalized or calibrated according to the present invention without departing from the spirit and scope of the present invention.

These calibration coefficients are used to adjust a characteristic magnitude of an inductive vehicle detector output prior to comparing the output to a threshold value (bivalent detector), or the threshold value itself is changed; typically with respect to the first-order calibration coefficient only.

There are several electrical parameters in an inductive vehicle detection circuit that tend to vary with environmental conditions, among these are circuit resistance or Q-factor which requires a first-order compensation coefficient and has already been discussed, and external capacitance which requires a second-order compensation coefficient. External capacitance can vary with the temperature of circuit board components, and it can vary with water intrusion into and around wire-loops and lead-lines. It is useful to periodically measure external capacitance and circuit resistance and to update the appropriate normalizing coefficients accordingly to compensate for environmental drift.

Wire-loop geometry is subject to wide variation according to installation procedures, design, and other arbitrary factors. To accurately and repeatably measure vehicle features, such as inductive length, and operating parameters such as speed and acceleration, it is useful to have an accurate measure of the dimensions of the wire-loops that are being used as vehicle sensors. These wire loops can be measured directly, they can be calibrated using the signatures of known vehicles as a reference, and they can be calibrated using the signatures of known vehicle types as a reference.

One way to accomplish this is to record an inductive time signature for a vehicle using one or more wire loops of known dimensions, and normalize this signature(s) into an inductive length signature. Then record an inductive time signature for the same vehicle using one or more wire loops of unknown dimensions, and normalize this signature using a set of assumed dimensions for the loops having unknown dimensions; compare the inductive length signatures from the known and unknown loops. Continue re-normalizing the signatures from the unknown loop(s) by varying the assumed dimensions until the best match between the known and unknown inductive length signatures is found. The assumed dimensions which generate the best match are then taken to be the calibrated dimensions of the loops which for which the dimensions were previously unknown.

For the case in which the vehicle has constant acceleration over the two loops, the following equations are applicable.

$$0=\tfrac{1}{2}*at_a^2+v_0t_a$$

$$D=\tfrac{1}{2}*at_b^2+v_0t_b$$

$$0=\tfrac{1}{2}*at_c^2+v_0t_c+L$$

$$D=\tfrac{1}{2}*at_d^2+v_0t_d+L$$

where D is distance between loops,
L is the length between features,
a is acceleration,
$v_0$ is initial speed,
$t_a$ is the time the car crossed the first loop,
$t_b$ is the time the car crossed the second loop,
$t_c$ is the time the car left the first loop, and
$t_d$ is the time the car left the second loop. Given $t_a$, $t_b$, $t_c$, $t_d$, and D, the vehicle's length, acceleration, and speed can be determined.

Inductive length measurements are a strong function of the normalized amplitude of an inductive vehicle detector output, and an applied detection threshold. Where such measurements are used for the classification, identification, or re-identification of vehicles it is useful to normalize the amplitude of these detector outputs or the applied detection threshold to produce consistent and repeatable length, speed, or acceleration measurements as desired.

Figure 4:
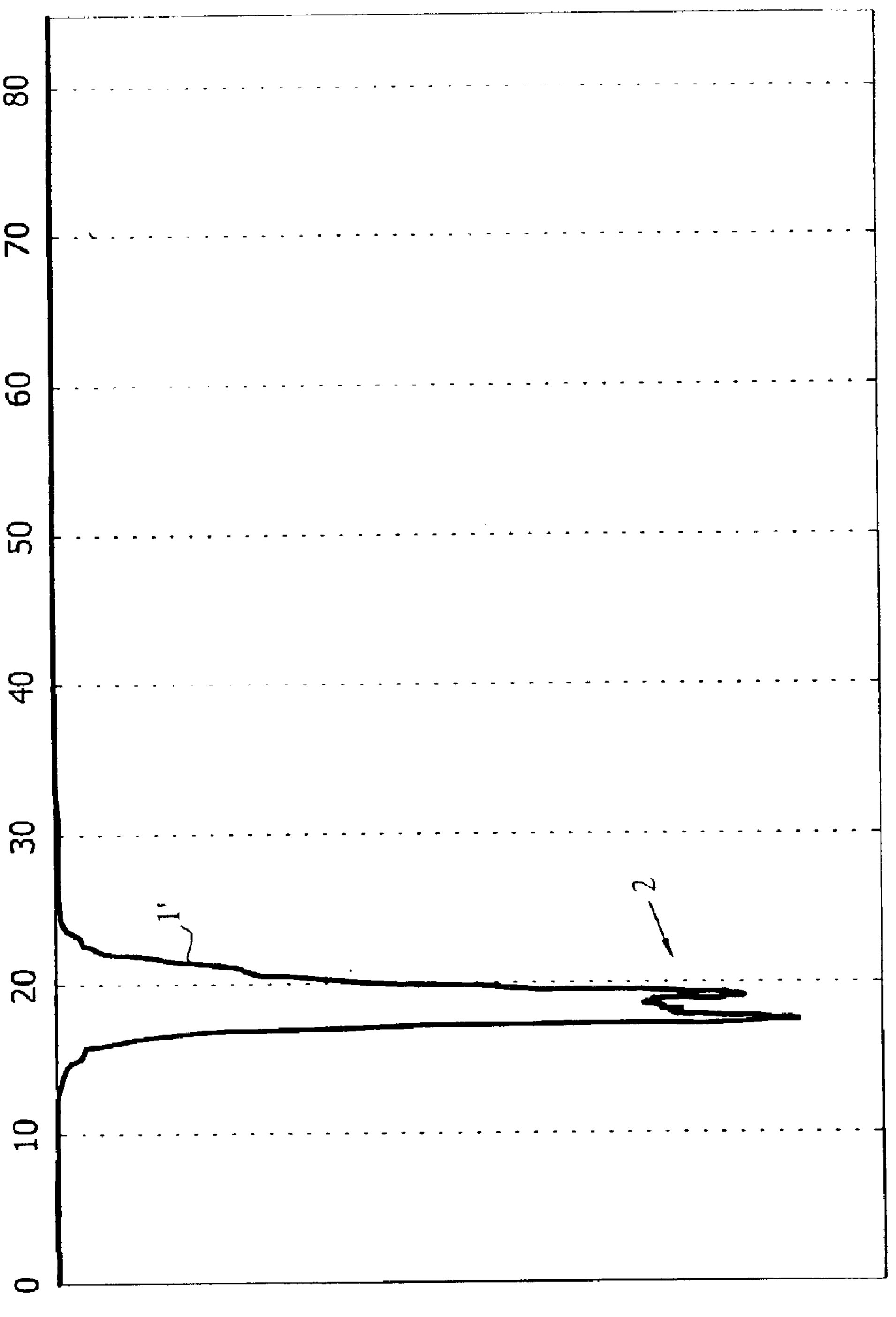
FIG. 4 depicts a typical Southern California Freeway Vehicle Population Distribution, measured in the Spring of 2002, showing the relative incidence and average inductive signature magnitude for vehicles having calibrated inductive lengths between zero and eighty-five feet.
Figure 5:
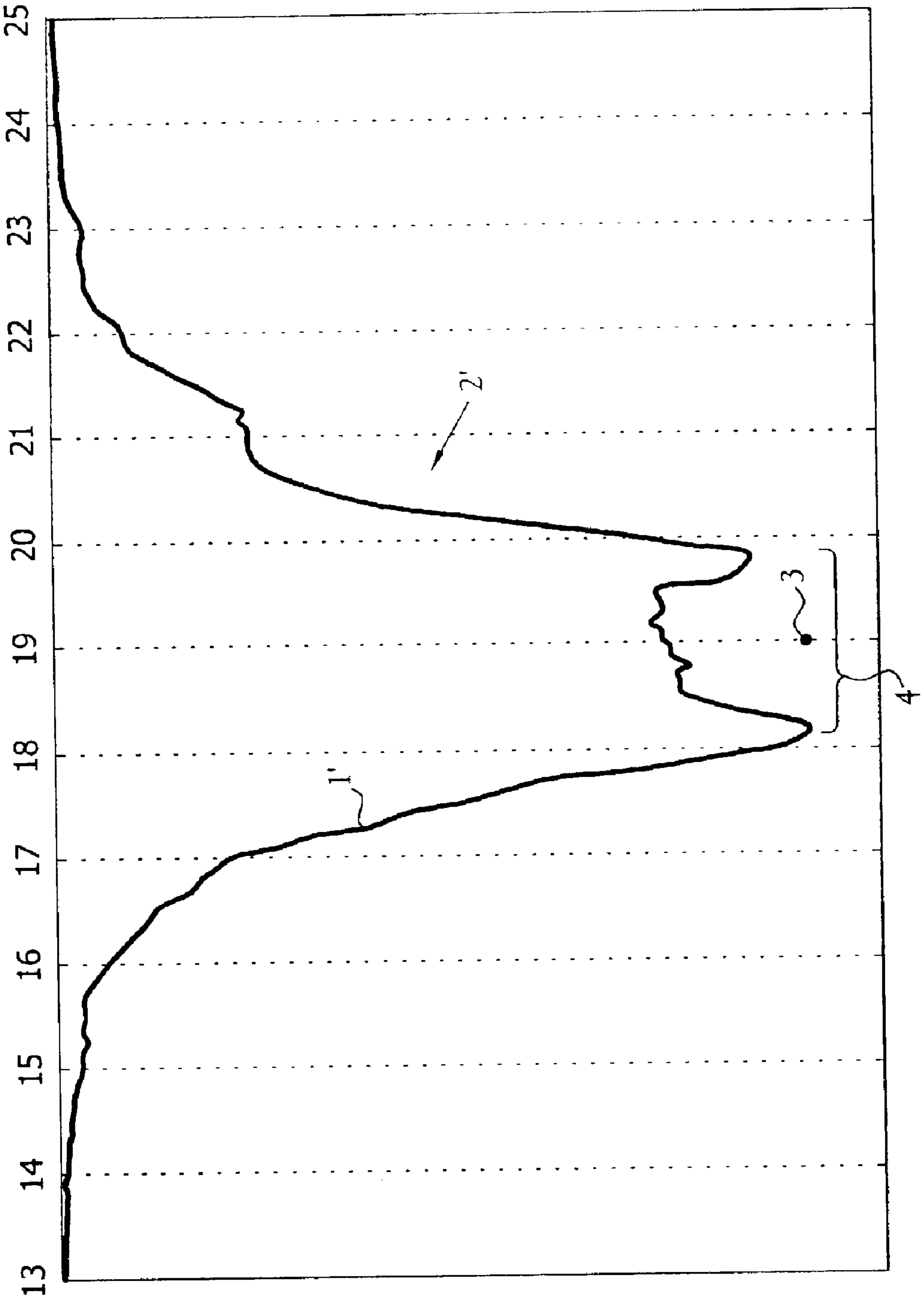
FIG. 5 depicts an expanded sectional view from FIG. 4 for vehicles having calibrated inductive lengths between thirteen and twenty-five feet.

FIG. 4 illustrates a typical vehicle population distribution from the Southern California freeways during the Spring of 2002. FIG. 5 illustrates an expanded portion of FIG. 4 corresponding to approximately 13 to 25 feet. In one embodiment of the present invention, a standard population distribution table, FIGS. 4 and 5, is rendered based on one or more features measured for a plurality of vehicles. The parameters measured generally include inductive length, maximum signature magnitude, number of local maxima, etc.

The population distribution of two vehicle parameters are presented in this table: the relative population distribution for Calibrated Vehicle Inductive Length (CVIL) 1 and Calibrated Average Maximum Inductive Signature Magnitude (CAMISM) vs. CVIL 2. The total area under the relative population distribution for CVIL trace 1 corresponds to 100% of the vehicle population represented (all vehicles having a measured inductive length of between 0–85 feet); the area under the same trace 1 for any smaller range of calibrated inductive lengths corresponds to the relative rate of occurrence of vehicles in the smaller range as a percentage of the total vehicle population. For example, in FIG. 5, the area under trace 1' corresponds to the relative rate of occurrence of vehicles having a CVIL of between 13–25 feet. The measured vehicle inductive lengths in the standard population distribution table, FIGS. 4 and 5, have been calibrated to an arbitrarily chosen mean of 19.0 feet (for vehicle inductive lengths between 19–25 feet), and an arbitrarily chosen sensitivity threshold, for f(L), of −1000. Before calibration, the local population distributions of vehicle inductive length for a plurality of detectors had substantially similar shapes as the calibrated trace, 1, but their mean inductive lengths varied significantly from one another. The detector outputs were then calibrated for inductive length by choosing a first-order coefficient for each detector such than when the signature output of each detector was multiplied by its corresponding first order coefficient, and using the arbitrarily chosen sensitivity threshold of −1000 for each detector output, the mean CVIL for each detector's local population distribution table was shifted to the arbitrarily chosen standard mean of 19.0 feet. Thereafter, local values of CVIL measured by each detector for any given vehicle were substantially consistent with the standard table, and with each other.

The Calibrated Average Maximum Inductive Signature Magnitude (CAMISM) vs. CVIL traces, 2 & 2', represent the average maximum inductive signature magnitudes for vehicles having the corresponding CVIL. A second-order calibration coefficient for each detector's signature output was chosen such that the CAMISM for vehicles having a CVIL of 19.0 feet, 3, would fall as close as possible to an arbitrarily chosen value of −16384. In this region 4 of the CAMISM traces, 2 & 2', there is a fairly horizontal slope; calibrating to a point, 3, on the CAMISM trace, 2 & 2', near the center of this region, 4, is generally less sensitive to small errors in the calibration of inductive length.

Though the present invention has been illustrated using inductive signature detectors, and the inductive length and maximum magnitude parameters of inductive signatures, it is anticipated that any other inductive signature parameters, or parameters associated with other types of vehicle detectors, are used to calibrate a vehicle detector without departing from the spirit or scope of the present invention. Calibration of any vehicle detector output based on a measured feature of a standard vehicle population will be understood to fall within the scope of the present invention. Calibration of any vehicle detector output based on a measured feature of a local vehicle population will be understood to fall within the scope of the present invention.

It is particularly useful to use a measured characteristic of a local vehicle population to calibrate a vehicle detector when the vehicle detector is not in communication with other detectors (e.g., stand alone operation). When a vehicle detector is in communication with other detectors, additional calibration precision is attained by combining two or more of the various calibration methods of the present invention (e.g., cascade).

Inductive sensors are deployed in a wide variety of shapes and sizes. One common configuration is for two 2-meter square wire-loops, 4-meters apart, to be placed in a single traffic lane to form a speed-trap. The dimensions of each loop, and the separation between the loops, is subject to both random and intentional variations from one installation to another. It is useful for a vehicle detector to be able to sense and compensate for these inconsistencies. The present invention does this by comparing one or more characteristics of the local vehicle population distribution to a standard vehicle population distribution table, and then calibrating various detector parameters so as to cause the population distribution of a detector output to substantially match a standard population distribution. For example, if a pair of 2-meter square loops are placed 6-meters apart instead of the expected 4-meters, then the vehicle speeds estimated by the detector pair (the two detectors connected to these two loops) would be slower than in reality, and therefore the measured inductive lengths would be shorter than expected. However, by matching the local population distribution to the standard, this discrepancy can be exposed and quantified. The assumed 4-meter separation between the detectors, which is part of the speed-trap equation, can be adjusted to a value which will cause the measured local population distribution to substantially match the standard population distribution, 6-meters in this example.

When using common wire-loop speed-traps of this type, 2-meter square, which do not cover the entire traffic lane, it is typical for the measured signature magnitudes from the upstream loop and the downstream loop to be different. This is typically due to a lateral velocity of the vehicle (zero lateral velocity occurring when the vehicle is traveling straight down the lane). The maximum signature magnitude occurs when the vehicle is substantially centered over the wire loop, and diminishes as the vehicle is offset to either side of center. Therefore, when two signatures are measured for the same vehicle using this type of wire-loop, it is preferred to designate the signature with the greatest magnitude as the dominant signature. The other signature is designated as the recessive signature, and can be scaled to match the dominant signature. When an n-th order calibration equation is used to calibrate an inductive signature, it is desirable to also use an n-th order scaling equation with substantially similar coefficients as the calibration equation when scaling the signature during subsequent normalization or correlation operations.

The vehicle inductive length and signature magnitude population distributions depicted in FIGS. 4 and 5 are typical of Southern California freeways as of the Spring of 2002. The peak in the CVIL trace, 1 & 1', at around 18.25 feet roughly corresponds with the incidence of compact cars, minivans, and Sport Utility Vehicles (SUVs) in the local population. The peak in the CIVIL trace, 1 & 1', at around 19.75 feet roughly corresponds with passenger cars. The shoulder in the CVIL trace at around 21 feet roughly corresponds with the incidence of full-size cars and king-cab pickup trucks in the local population. Motorcycles represent a small percentage of this local population, and are grouped at a CVIL of around 8 feet. Tractor trailers for a small percentage of this population with CVIL's of 60–70 feet being typical. This profile, when combined with a classification of the vehicles according to any econometric measure, can be used to produce an econometric profile of the local vehicle population. Significant variations in this profile from one continent to another are to be expected; less dramatic local variations can be used to characterize a local economy, and to spot trends in a local economy. Such use falls within the scope of the present invention.

In one embodiment of the present invention, a mobile passive inductive loop detector, comprising a pickup coil, is transported by a service vehicle. When the service vehicle encounters a fixed-point inductive loop detector, the mobile passive inductive loop detector measures one or more characteristics of a signal emitted by the fixed-point detector. For example, if the fixed point detector is a frequency counting type detector, then one of the characteristics measured by the mobile passive inductive loop detector is the frequency of the fixed point detector; another characteristic of the fixed-point detector that is measured is the frequency variation of the fixed-point detector in response to the presence of the service vehicle. By measuring a sequence of frequency response characteristics of the fixed-point detector that change as the service vehicle moves in relation to the fixed point detector, an inductive signature of the service vehicle is recorded. It is known in the prior art to use the fixed-point detector to record a first inductive signature; however, the present invention uses a mobile passive inductive loop detector comprising a pickup coil to measure a second inductive signature that is substantially similar to the first inductive signature measurable by the fixed-point detector. The advantage to this is that a service vehicle, having a known inductive signature generating profile, is driven over any deployed wire-loop sensor and records the frequency response of the fixed-point sensor due to the presence of the known service vehicle. This allows for many diagnostic parameters for the fixed-point detector to be measured without the necessity of having direct physical access to the vehicle detection circuitry of the fixed-point detector.

When used in combination with GPS and/or other position determining equipment (e.g., inertial reference system), the precise location of fixed-point inductive loop detectors in the field may be recorded along with the wirelessly measurable electrical parameters. Some of the wirelessly measurable electrical parameters that it is desirable to measure from a moving service vehicle include: the frequency response of the fixed-point detector circuit due to a known vehicle, the noise level on the fixed-point detector circuit, weather related variability of the fixed-point detector circuit frequency response (e.g., external capacitance and/or grounding due to rain), interference between closely spaced inductive loop detector circuits (e.g., crosstalk), wire-loop sensor footprint with respect to the traffic lane markings, wire-loop sensor geometry (e.g., multiple loop-heads wired together in series or parallel), etc. By wirelessly measuring these parameters from a mobile service vehicle rather than by manually accessing the detector circuitry directly, it is possible to safely and efficiently ground-truth a vehicle detector's performance without the necessity of involving local maintenance personnel. The service vehicle carrying the mobile passive inductive loop detector of the present invention is dedicated to the task of diagnosing loop detectors in the field, or an automated detector package is carried by any one of a number of fleet-type vehicles in which case the time, location, and measured parameters from inductive loops encountered in the field are logged for later retrieval and analysis. The mobile passive inductive loop detector of the present invention includes a pickup coil, either a fast sampling A/D converter or a zero-crossing detector, a bivalent signal detector that indicates the presence or absence of a relatively strong external signal, an optional onboard signal analyzer, and an onboard data logging system.

In one embodiment comprising a fast sampling A/D converter, analog signals detected by the pickup coil are converted to a stream of digital samples. In one embodiment comprising a bivalent signal detector, the absolute value of a fixed number of digital samples produced by the A/D converter are summed to produce a representation of the total energy of the pick-up signal. This total energy representation is then compared to a threshold value. When the total energy exceeds the threshold value, then further processing of the digital samples is indicated. When the total energy does not exceed the threshold value, then no further processing of the digital samples is indicated. Further processing of the digital samples includes the storage of the raw digital samples for later analysis, or an immediate analysis of the samples and storage of the raw samples and/or results. One method for analyzing the samples uses an FFT (Fast Fourier Transform). Contemporaneous time and position information is typically stored along with the electronic signal information recorded. This allows for a detailed mapping of the location of each fixed-point detector surveyed. The locations where operating fixed-point detectors are not detected is also noted. Where problems are detected such as missing (e.g., non-functioning) detectors, improper frequency settings, poor signal-to-noise ratios, etc., remedial action may be planned based on the mobile passive inductive loop detector survey results. Periodic, or continual, mobile passive inductive loop detector surveys are conducted to maintain the reliability of any operational vehicle detector system. The concepts of the present invention may be applied to other types of field-deployed vehicle detection systems which emit active signals including radar-based, ultrasonic-based, laser-based, and infrared-strobe utilizing camera-based vehicle detector systems without departing from the spirit and scope of the present invention.

In one embodiment of the present invention, a fixed-point inductive loop detector is able to sense the presence of a mobile service vehicle when it is in close proximity to a wire-loop sensor associated with the detector and the two devices, mobile and fixed-point devices, communicate digital information with each other. For example, it is useful for the fixed-point detector to be able to communicate identification information (e.g., serial number) to the mobile service vehicle; and it is useful for the mobile service vehicle to send inductive signature calibration coefficients, based on its own inductive signature, to the fixed-point detector. The detector responds by adjusting a digital signal processor or other processing device to adjust the output based upon the characteristics of the particular sensor configuration.

Out-of-pavement vehicle detectors (e.g., side-fire radar, passive acoustic, ultrasonic, cameras, etc.) are sometimes desirable for collecting speed, volume, and occupancy traffic-flow data where in-pavement sensors are not already installed. They may be installed on the roadside or on overhead mounts to collect traffic data without the need for permanently installing sensors in the roadway. In the prior-art, it has proven difficult to achieve an acceptable level of accuracy using such out-of-pavement detectors without undue effort to tune and calibrate the detectors. It is an object of the present invention to calibrate an out-of-pavement vehicle detector using feedback from a second vehicle detector. This is useful for product development and algorithm development. It is a second object of the present invention to calibrate an out-of-pavement vehicle detector using real-time feedback from a second vehicle detector in-situ where the out-of-pavement detector is to be deployed in the field.

In one embodiment, a temporarily deployed on-pavement sensor (e.g., tape-down wire-loop sensor, road tubes, etc.) is deployed as the second sensor to provide the real-time feedback for calibrating the out-of-pavement detector in-situ. Because temporarily deployed on-pavement sensors are highly accurate speed, volume, and occupancy detectors when used properly, they are ideal for in-situ calibration of any out-of-pavement detector. Nevertheless, any other sort of temporarily deployed detector may be used as the feedback/reference source for in-situ calibration of an out-of-pavement detector without departing from the spirit or scope of the present invention.

In one embodiment, real-time feedback from a temporarily deployed reference sensor is used to optimize the speed, volume, and/or occupancy detection precision of an out-of-pavement vehicle detector by simultaneously collecting traffic flow data using both detectors. The data collected by the out-of-pavement detector is compared to the data collected by the reference detector to determine a first error quantity for the out-of-pavement detector. Then at least one physical, optical, electrical, or algorithmic parameter of the out-of-pavement detector system is varied. New traffic-flow data is simultaneously collected by the out-of-pavement vehicle detector and the reference detector and compared to produce a second error quantity for the out of pavement detector. If the second error quantity is more favorable than the first error quantity, then the variation of the detector system parameter is potentially the cause of the improvement. By repeating these steps, one or more variable parameters of the out-of-pavement detector system may be optimized over time. It is another object of the present invention to optimize one or more variable parameters of an out-of-pavement detector system using feedback from a reference detector system. Once in-situ training of the out-of-pavement vehicle detector is complete, the accuracy of the out-of-pavement detector may be certified to a known degree of accuracy. The temporarily installed reference detector system may be completely, or partially, removed. The calibration and training method of the present invention may be employed at any time after the installation of any out-of-pavement vehicle detection system. This process is repeated at any time to improve the accuracy of the out-of-pavement detector, to compensate for changes in the geometry of the roadway, and/or to verify its continued operation is within acceptable accuracy limits.

It is common practice in the art of traffic engineering for lane occupancy, a measure of the percentage of the longitudinal area of a traffic lane that is occupied by vehicles, to be reported as a simple percentage of loop detector on-time/total-time for some pre-determined data aggregation period. Because a loop detector's on-time is a function of the longitudinal (e.g., in the direction of vehicle travel) dimension of the wire-loop sensor as well as the percentage of the longitudinal area of the traffic lane that is occupied by vehicles, a systematic error in the reported lane occupancy in introduced. This systematic error is not consistent for varying wire loop sensor dimensions, varying vehicle speeds, or varying types of vehicle detection technologies; it is therefore desirable to normalize measured lane occupancy to a more consistent value. In one embodiment of the present invention, lane occupancy is normalized to better approximate the true percentage of the longitudinal area of the traffic lane that is occupied by vehicles under all traffic flow conditions. In one embodiment, this is accomplished by measuring a speed and an inductive length of a vehicle as a function of vehicle speed, and a loop detector on-time (e.g., inductive length=speed×loop detector on-time); subtracting a longitudinal dimension of the inductive loop from the inductive length and computing a normalized on-time (e.g., normalized on-time=(inductive length−longitudinal dimension of the inductive loop)/speed). Normalized lane occupancy may then be reported as a percentage of normalized on-time/total-time. According to one embodiment of the present invention, the timing and duration of pulses generated by an inductive vehicle detector, or other comparable traffic-flow detector with contact-closure type outputs, may be adjusted to reflect the normalized lane occupancy. This may be accomplished by delaying the output of the contact-closure signal until a normalized lane occupancy signal has been defined, and then outputting a normalized (e.g., selectively shortened) pulse rather than the un-normalized on-time pulse as is common practice in the prior-art.

It is common for quartz crystals, used to provide a time-base pulse train to an electronic circuit, to have a resonant frequency that is slightly (e.g., observed frequency tolerance is typically on the order of one part in sixthousand) different from the expected value. When such crystals are used as a time-base for a field-deployed inductive vehicle detector, it is desirable to correct for this deviation from the expected frequency. In one embodiment, a frequency of a quartz crystal is measured with reference to a time-base of known frequency. The variation of the crystal's measured frequency from a desired value is noted, and a compensation factor is computed. A time-base signal output of the crystal is then processed by a correction circuit (e.g., Digital Difference Analyzer—DDA, etc.) which outputs a corrected time-base output pulse train. In another embodiment, the time-base frequency of a real time clock (RTC) of a personal computer (PC) is compared to a reference time-base frequency generator. The variation of the PC's RTC time-base generator from a desired value is measured thereby, and a correction (e.g., drift) factor for the PC's RTC time-base generator is determined. Then, a real time clock output of the PC may be adjusted to compensate for the un-desirable drift of the PC's RTC time-base generator. This calibrated PC RTC time-base is then used as the reference time-base.

A signal quality monitoring method for a vehicle detection system includes the steps of a) measuring a baseline noise level; b) avoiding detectors on the same frequency by selecting an operating frequency having a relatively low baseline noise level, especially near the operating frequency; this may be accomplished by demodulating the input signal at a frequency that is slightly offset from the operating frequency to be analyzed, and then looking for a beat frequency corresponding to the difference between the offset frequency and the slightly offset demodulation frequency; c) automatically setting a detection threshold to an optimal level to minimize false detections and maximize real detections (or set the detection threshold to a manual setting as desired); in one embodiment this is accomplished by measuring a standard deviation from the baseline, noise, and then setting the detection threshold to be some multiple of this standard deviation; d) measuring a vehicle detector signal level; e) measuring the quality of a recent history of vehicle detection events, or lack thereof; and f) when the quality of a recent history of vehicle detection events falls below a pre-determined threshold, re-evaluating the operating conditions of the vehicle detection circuitry and re-configuring for a more favorable signal-to-noise ratio for vehicle detector measurements.

From the foregoing description, it will be recognized by those skilled in the art that methods and apparatus for normalizing inductive vehicle signatures have been provided. In one embodiment, normalization coefficients are determined by comparing the signature produced by one or more probe vehicles. In another embodiment, normalization coefficients are determined from one or more operating or circuit parameters.

In one embodiment, the first order normalization coefficient is applied to the detector circuit through an amplifier. In another embodiment, the first and higher order normalization coefficients are applied by manipulating the digitized signatures through a digital signal processor.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A method for normalizing signatures obtained from a plurality of inductive vehicle detectors, said method comprising the steps of:

a) driving a first vehicle over a first wire loop sensor connected to a first detector;

b) producing a first inductive vehicle signature from said first detector;

c) driving said first vehicle over a second wire loop sensor connected to a second detector;

d) producing a second inductive vehicle signature from said second detector;

e) comparing said first inductive vehicle signature to said second inductive vehicle signature; and f) determining at least one normalization coefficient from a comparison of said first inductive vehicle signature to said second inductive vehicle signature.

2. The method of claim 1 wherein said at least one normalization coefficient includes a first order coefficient, and said method further including a step of applying said first order coefficient to said first detector.

3. The method of claim 2 wherein said first order coefficient is a scaling coefficient whereby said output of said detector is multiplied by said scaling coefficient.

4. The method of claim 1 wherein said at least one normalization coefficient includes a second order coefficient, and said method further including a step of applying said second order coefficient to said first detector.

5. The method of claim 1 further including a step of manipulating said first inductive vehicle signature to produce a normalized inductive vehicle signature.

6. The method of claim 5 wherein said step of manipulating is performed digitally.

7. The method of claim 1 wherein said steps a) through d) are repeated with a second vehicle.

8. A method for normalizing signatures obtained from a plurality of inductive vehicle detectors, said method comprising the steps of:

a) measuring a first parameter of a first inductive vehicle detector;

b) measuring a second parameter of a second inductive vehicle detector;

c) comparing said first parameter to said second parameter;

d) determining at least one normalization coefficient from a comparison of said first parameter to said second parameter.

9. The method of claim 8 wherein said first parameter is related to a Q-factor of said first inductive vehicle detector, and said second parameter is related to a Q-factor of said second inductive vehicle detector.

10. The method of claim 8 wherein said at least one normalization coefficient includes a first order coefficient, and said method further including a step of applying said first order coefficient to said first detector.

11. The method of claim 8 further including a step of multiplying an output of said first inductive vehicle detector by a factor equal to said at least one normalization coefficient.

12. The method of claim 8 further including a step of manipulating an output of said first inductive vehicle detector to produce a normalized inductive vehicle signature, wherein said step is performed by a differential amplifier.

13. The method of claim 8 further including a step of manipulating an output of said first inductive vehicle detector to produce a normalized inductive vehicle signature, wherein said step is performed by a differential amplifier having a programmable gain controlled by said first parameter.

14. The method of claim 8 further including a step of manipulating an output of said first inductive vehicle detector to produce a normalized inductive vehicle signature, wherein said step of manipulating is performed digitally.

15. The method of claim 8 further including steps of a) measuring a third parameter of a first inductive vehicle detector;

b) measuring a fourth parameter of a second inductive vehicle detector;

c) comparing said third parameter to said fourth parameter;

d) determining at least one normalization coefficient from a comparison of said third parameter to said fourth parameter.

16. An apparatus for normalizing an inductive vehicle signature, said apparatus including:

a wire loop sensor;

an inductive vehicle detector connected to said wire loop sensor;

a differential amplifier connected to said inductive vehicle detector, said differential amplifier having a gain equal to a first order normalization coefficient;

whereby said differential amplifier multiplies the inductive vehicle signature by said first order normalization coefficient.

17. The apparatus of claim 16 further including a measuring circuit for determining a loop circuit impedance for said inductive vehicle detector and said wire loop sensor, said measuring circuit automatically setting said gain of said differential amplifier.

18. An apparatus for normalizing an inductive vehicle signature, said apparatus including:

a wire loop sensor;

an inductive vehicle detector connected to said wire loop sensor, said inductive vehicle detector producing the inductive vehicle signature;

an analog to digital converter connected to an output of said inductive vehicle detector; and a processor connected to said analog to digital converter, said processor applying at least one normalization coefficient to the inductive vehicle signature.

19. The apparatus of claim 18 wherein said at least one normalization coefficient includes a first order coefficient, said processor multiplying the inductive vehicle signature by said first order coefficient.

20. The apparatus of claim 18 wherein said at least one normalization coefficient includes a first order coefficient, said processor right-shifting a raw inductance measurement sample.

21. The apparatus of claim 18 wherein said at least one normalization coefficient includes a first order coefficient and a second order coefficient, said processor applying said first order coefficient and said second order coefficient to the inductive vehicle signature.

22. The apparatus of claim 18 wherein said at least one normalization coefficient includes a second order coefficient, said processor applying said second order coefficient to the inductive vehicle signature.

23. The apparatus of claim 18 further including a differential amplifier connected between said inductive vehicle detector and said analog to digital converter, said differential amplifier having a gain equal to a first order normalization coefficient.

24. The apparatus of claim 18 wherein said processor includes a routine that measures an average differential energy of a series of raw inductive signature samples, a sensitivity threshold is adjusted by said average differential energy whereby said average differential energy corresponds to a measure of an average noise level on said series of raw inductance measurement samples.

25. The apparatus of claim 18 wherein said processor includes a routine that measures a baseline noise level of a series of inductive vehicle signatures on said inductive vehicle detector;

avoids an other detector having a frequency that is identical to an operating frequency of said inductive vehicle detector by selecting said operating frequency having a relatively low baseline noise level;

automatically sets a detection threshold to an optimal level to minimize false detections and maximize real detections;

measures a vehicle detector signal level;

measures a quality of a recent history of vehicle detection events; and when the quality of said recent history of vehicle detection events falls below a pre-determined threshold, re-evaluating a plurality of operating conditions of said inductive vehicle detector and re-configuring for a more favorable signal-to-noise ratio.

* * * * *